US007000450B2

(12) United States Patent
Unger et al.

(10) Patent No.: US 7,000,450 B2
(45) Date of Patent: Feb. 21, 2006

(54) METHOD, COMPUTER PROGRAM AND DEVICE FOR MEASURING THE INJECTION QUANTITY OF INJECTION NOZZLES, ESPECIALLY FOR MOTOR VEHICLES

(75) Inventors: Joachim Unger, Gerlingen (DE); Wolfram Von Huelsen, Gerlingen (DE); Hermann Bolle, Weingarten (DE); Ralf Bindel, Winterbach (DE); Ralf Haas, Illingen (DE); Dirk Wolf, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 10/257,243

(22) PCT Filed: Feb. 1, 2002

(86) PCT No.: PCT/DE02/00376

§ 371 (c)(1),
(2), (4) Date: May 28, 2003

(87) PCT Pub. No.: WO02/064970

PCT Pub. Date: Aug. 22, 2002

(65) Prior Publication Data

US 2003/0177817 A1 Sep. 25, 2003

(30) Foreign Application Priority Data

Feb. 15, 2001 (DE) ................................ 101 07 032

(51) Int. Cl.
*F02M 65/00* (2006.01)
*G01F 17/00* (2006.01)

(52) U.S. Cl. ........................ 73/1.36; 73/119 A; 73/149; 702/55

(58) Field of Classification Search ................. 73/1.36, 73/1.74, 119 A, 37, 149; 702/55, 114; 701/99, 701/101–102, 104
See application file for complete search history.

(56) References Cited

U.S. PATENT DOCUMENTS 4,665,742 A * 5/1987 Abt et al. .............. 73/119 A X
4,714,998 A * 12/1987 Bussey et al. ......... 73/119 A X
4,758,389 A * 7/1988 Lampl ........................ 264/40.1
5,455,772 A * 10/1995 Burke et al. .................. 701/99
6,260,404 B1 * 7/2001 Aota et al. .................... 73/1.36
6,755,076 B1 * 6/2004 Schmidt et al. ............... 73/116
2003/0140686 A1 * 7/2003 Bindel et al. ............. 73/119 A
2003/0145648 A1 * 8/2003 Unger et al. ............... 73/118.1
2003/0150259 A1 * 8/2003 Unger et al. .............. 73/119 A

FOREIGN PATENT DOCUMENTS

FR 2795139 A1 * 12/2000
JP 57200817 A * 12/1982 .............. 73/861.01

* cited by examiner

*Primary Examiner*—Thomas P. Noland
(74) *Attorney, Agent, or Firm*—Ronald E. Greigg

(57) ABSTRACT

In a method for measuring the injection quantity of injection systems, in particular for motor vehicles and in particular in production testing, an injection system injects a testing fluid into a measuring chamber. A detection device detects a movement of a piston, which at least partially defines the measuring chamber. This detection device generates a corresponding measurement signal. In order to increase the precision of the calculation of the injected testing fluid mass, the invention proposes that the pressure of the testing fluid in the measuring chamber be detected and that the measurement signal be processed taking into account the detected pressure.

22 Claims, 2 Drawing Sheets

METHOD, COMPUTER PROGRAM AND DEVICE FOR MEASURING THE INJECTION QUANTITY OF INJECTION NOZZLES, ESPECIALLY FOR MOTOR VEHICLES

CROSS-REFERENCE TO RELATED APPLICATIONS

This application is a 35 USC 371 application of PCT/DE 02/00376, filed on Feb. 1, 2002.

BACKGROUND OF THE INVENTION

1. Field of the Invention

The current invention relates to a method for measuring the injection quantity of injection systems, in particular for motor vehicles and in particular in production testing, in which a testing fluid is injected into a measuring chamber by an injection system and the injection-induced movement of a piston, which at least partially defines the measuring chamber, is detected by a detection device, which transmits a measurement signal.

2. Description of the Prior Art

A method of the above kind is known from the market. The method is applied by using a device, which is referred to as an injected fuel quantity indicator. This component is comprised of a housing in which a piston is guided. The inner chamber of the housing and the piston define a measuring chamber. This measuring chamber has an opening against which an injection system, for example an injector with an injection nozzle, can be placed in a pressure-tight manner. When the injection system injects fuel into the measuring chamber, a fluid contained in the measuring chamber is displaced. This causes the piston to move, which is detected by a distance sensor. The volume change of the measuring chamber and of the fluid contained therein and therefore the quantity of fuel injected can be calculated from the distance traveled by the piston.

In the known injected fuel quantity indicator, a device comprised of a measuring plunger and an inductive distance measuring system is used to measure the movement of the piston. The measuring plunger is embodied as a probe or is connected to the piston. When the piston moves, this also causes the measuring plunger to move and finally, the movement of the measuring plunger is detected and a corresponding signal is sent to an evaluation unit.

The known method already operates with a very high degree of precision with regard to the detected movement of the measuring plunger. However, the mass of the injected testing fluid calculated from this movement and the volume of injected fuel likewise calculated from it fall somewhat below the path measurement in terms of the precision. This problem is more intense the smaller the movement of the piston is, i.e. the smaller the injected testing fluid quantity is. But it is precisely these small quantities of testing fluid that current and future injection nozzles must be able to reliably inject.

The object of the current invention, therefore, is to modify a method of the type mentioned at the beginning so that it permits a more precise determination of the mass of the injected testing fluid and of the volume of testing fluid injected.

This object is attained in that the pressure of the testing fluid is detected in the measuring chamber and the measurement signal is processed taking into account the pressure detected.

SUMMARY OF THE INVENTION

Detecting and measuring pressure changes results in the fact that with an injection of testing fluid, the actually injected fluid mass can be determined with greater precision. The invention is in fact based on the recognition that the mass of a particular volume depends on the density prevailing in this volume. However, the density inside a volume also depends on the pressure prevailing in the volume.

Because the pressure, which prevails in the testing fluid contained in the measuring chamber, is detected according to the invention, the properties of the testing fluid in the measuring chamber can be precisely determined and consequently, the corresponding injected mass can also be calculated precisely from the measured volume. By taking into account the pressure actually prevailing in the measuring chamber, it is also possible to convert the injected volume measured at a particular pressure into a particular comparison value (e.g. 1 bar). In this manner, it is very easily possible to compare different injections and different injection systems to one another since these measured injection quantities are based on the same ambient conditions.

The method according to the invention thus makes the determination of the mass of testing fluid injected into the measuring chamber more precise and also permits the calculation of a volume based on particular ambient conditions, which in turn permits a better comparison of different injection systems.

In a first modification, the invention proposes that the temperature of the testing fluid be detected in the measuring chamber and that the measurement signal be processed taking into account the temperature of the testing fluid. This modification assures that the properties of the testing fluid contained in the measuring chamber depend not only on the pressure but also on the temperature of the testing fluid in the measuring chamber. This further increases the precision and comparability of testing values.

Alternatively, the invention also proposes that taking into account the measured pressure and possibly the measured temperature, the density of the testing fluid in the measuring chamber is determined and based on this, a comparison volume at a particular comparison pressure and possibly at a particular comparison temperature is determined. This is a simple and very precise method for determining a parameter, which can be used to precisely compare the quality of different injection systems.

In another modification of the method according to the invention discloses that the progression of the pressure during an injection is detected and the measurement signal is processed taking into account the detected progression of the pressure. This allows the method to take into account the fact that the pressure in the measuring chamber can change during an injection.

The invention also proposes that when the pressure of the testing fluid in the measuring chamber exceeds a limit, an error message is generated. It is relatively important for the precision of the measurement that the pressure of the testing fluid in the measuring chamber lie with a particular range of values. An excessive pressure in the measuring chamber, like an insufficient pressure, can lead to a distortion of the measurement result. This fact is taken into account by this modification.

It is particularly preferable that when the pressure of the testing fluid in the measuring chamber exceeds a limit, a safety device is activated, which reduces the pressure of the testing fluid in the measuring chamber. For example, it is possible that the movement of the piston might become blocked. In this instance, the pressure in the measuring chamber during an injection could reach a level that is critical for the measuring device. This can be detected by the pressure measurement and appropriate countermeasures can be initiated.

The current invention also relates to a computer program, which is suitable for executing the above method, when it is run on a computer. It is particularly preferable if the computer program is stored in a memory, in particular a flash memory.

In addition, the invention relates to a device for measuring the injection quantity of injection systems, in particular for motor vehicles, and in particular in production testing, having a measuring chamber into which a testing fluid can be injected by an injection system, having a piston, which at least partially defines a measuring chamber, and having a detection device, which detects a movement of the piston and generates a corresponding measurement signal.

In order to increase precision in the detection of the injected fluid mass, and also to permit a better comparison of the injection quantities and injection volumes measured in different injections, the invention proposes that the device include a detection device for the pressure of the testing fluid in the measuring chamber as well as a processing unit in which the measurement signal is processed, taking into account the pressure detected.

It is particularly preferable if the processing unit of the device is provided with a computer program as described above.

BRIEF DESCRIPTION OF THE DRAWINGS

An exemplary embodiment of the invention will be explained in detail below in conjunction with the accompanying drawings,in which.

DESCRIPTION OF THE PREFERRED EMBODIMENTS

Figure 1:
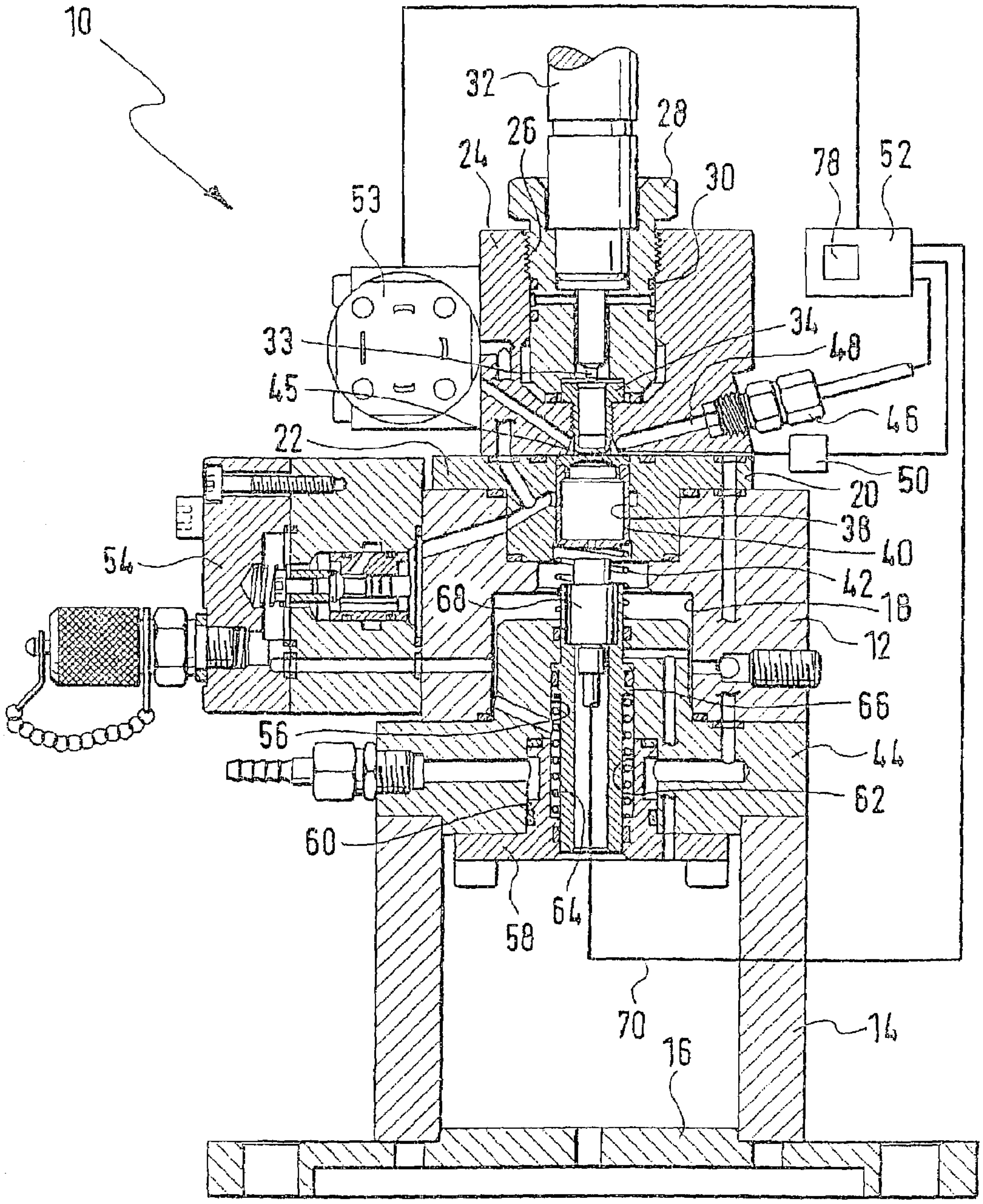
FIG. 1 shows a section through an exemplary embodiment of a device for measuring the injection quantity of injection nozzles.

In FIG. 1, a device for measuring the injection quantity of injection systems is labeled as a whole with the reference numeral 10. It includes a centrally disposed body 12, which is secured to a sleeve 14. This sleeve is in turn supported on a base plate 16. The device 10 is fixed by means of the base plate 16.

An essentially central stepped bore 18 is let into the central body 12. A cylindrical insert 20 is inserted into the upper section of the stepped bore 18 and is supported by means of a collar 22 against the top of the central body 12. A head 24 is placed onto the insert 20 in a pressure-tight fashion, which likewise has a stepped bore 26 let into it, which in the assembled state shown in FIG. 1, extends coaxial to the stepped bore 18. An adapter 28 is inserted from above into the stepped bore 26 and is sealed in relation to the stepped bore 26 by means of O-rings 30. An injection system, in this instance an injector 32, is inserted with its injection nozzle 33 into the adapter 28. The injector 32 is in turn connected to a high pressure testing fluid supply (not shown). An injection damper 34 is inserted into the lower region of the stepped bore 26 in the head 24.

The insert 20 also contains a bore 38, which in the installation position shown in FIG. 1, extends coaxial to the stepped bore 18 and to the stepped bore 26. A piston 40 is guided so that it can slide in the bore 38. A helical spring 42, which is supported against a transducer receptacle 44, pushes the piston 40 upward. A measuring chamber 45 is defined by the top end of the piston 40, the lower unthreaded region of the injection damper 34, and the lower region of the stepped bore 26. The piston 40 is embodied as a closed, hollow body.

The measuring chamber 45 formed between the piston 40 and the head 24 is filled with a testing fluid (unnumbered). The pressure of this testing fluid in the measuring chamber 45 is measured by a pressure sensor 50, which is disposed outside the intersecting plane of FIG. 1 and is therefore only depicted symbolically in the drawing. The pressure sensor 50 is inserted into the measuring chamber 45 through an oblique through bore (not shown). A temperature sensor 46 detects the temperature of the testing fluid in the measuring chamber 45. The pressure sensor 50 and the temperature sensor 46 are connected to a control and processing unit 52, whose output is connected to a magnetic drain valve 53, through which the testing fluid can be drained from the measuring chamber 45. To the left of the central body 12, there is also a constant pressure valve 54, which, even at very different gas pressures underneath the piston 40, provides for a drainage rate from the measuring chamber 45 that is virtually independent of the gas pressure underneath the piston 40 when the electromagnetically actuated drain valve 53 is open.

The transducer receptacle 44 likewise contains a stepped bore 56, which in the installation position shown in FIG. 1, is likewise coaxial to the other stepped bores 18, 26, and 38. A spring retainer 58 with a cylindrical shoulder 60 is mounted onto the underside of the transducer receptacle 44. The shoulder 60 engages in the stepped bore 56. The spring retainer 58 and its shoulder 60 also have a central stepped bore 62, which is open toward the bottom.

A shoulder of the stepped bore 62 in the spring retainer 58 supports a helical spring 64, which pushes a sensor retainer 66 upward against a collar of the transducer receptacle 44 that protrudes radially inward. The sensor retainer 66 is tubular or sleeve-shaped and its upper region has an eddy current sensor 68 screwed into it so that the top end of this sensor is a short distance under the bottom end of the piston 40. A connecting line 70 of the eddy current sensor 68 is routed outward through the tubular sensor retainer 66 and the spring retainer 58 and is connected to the control and processing unit 52.

In the event of a malfunction, for example due to an insufficient emptying of the measuring chamber 45 between two injections or two injection cycles, if the piston 40 moves too far downward, then it comes to rest with its bottom end in contact with the top end of the eddy current sensor 68. Because the sensor retainer 66 is supported by the helical spring 64, the piston 40, together with the eddy current sensor 68 and the sensor retainer 66, can move further downward—in this instance counter to the initial spring stress of the helical spring 64. A downward motion of the piston 40 is possible provided that the testing fluid can flow out of the measuring chamber 45 through a circumferential groove (unnumbered) in the stepped bore 38 of the insert 20. This prevents damage to the device 10 in the event of a malfunction.

The device 10, which is depicted in FIG. 1 and is for measuring the injection quantity of an injection nozzle 28, operates according to the following method (see FIG. 2):

Testing fluid (not shown) is supplied by means of the high pressure testing fluid supply to the injection system 32 and its injection nozzle 33 and, by means of the injection damper 34, is injected into the measuring chamber 45 that is likewise filled with testing fluid. The injection damper 34 prevents the injection jets from directly striking the top end of the piston 40. A direct impact of the injection jets against the piston 40 could set the piston into oscillations, which do not correspond to the actual course of the injection. The injection of testing fluid into the measuring chamber 45 increases the testing fluid volume in the measuring chamber 45. The additional volume traveling into the measuring chamber 45 moves the piston 40 downward, counter to the force of the helical spring 42 and the gas pressure underneath the piston 40. This changes the distance between the bottom end of the piston 40 and the eddy current sensor 68.

This change in the distance between the eddy current sensor 68 and the bottom end of the piston 40 results in a change in the complex input impedance on the input side of the winding of the eddy current sensor 68. This change is metrologically evaluated in the control and processing unit 52 and is used to determine a distance sm (block 72 in FIG. 2) that the piston 40 has traveled.

Based on the measured distance sm—after the start of the calculation in block 71, a volume Vm is determined in block 74. This corresponds to the volume by which the measuring chamber 45 has increased due to the movement of the piston 40. This volume is calculated from the measured distance sm and the cross sectional area of the piston 40, which is waiting in block 76 and has been called up from a memory 78.

In block 80, this volume Vm, which is also referred to as the “displacement volume”, is used to calculate the injected mass mi of testing fluid. This is done by multiplying the displacement volume Vm by the density of the testing fluid. However, the density of the testing fluid in the measuring chamber 45 on the one hand, depends on the temperature T (block 82) and on the other hand, depends on the pressure p (block 84), which prevail in the testing fluid in the measuring chamber 45. These are detected by the pressure sensor 50 and the temperature sensor 46 and, based on the detected values, in block 80, first the density prevailing in the testing fluid in the measuring chamber 45 is determined at the detected pressure p and the detected temperature T, and based on this density, the injected mass mi is determined.

Based on the actually injected mass mi of testing fluid, which has been injected into the measuring chamber 45, in block 86, a comparison or norm volume Vnorm is calculated based on a determined pressure pnorm and a determined temperature tnorm (block 88). This comparison or norm volume Vnorm is particularly well-suited for comparing different injections and for comparing different injection systems 32. The method depicted in FIG. 2 ends at block 92.

Figure 2:
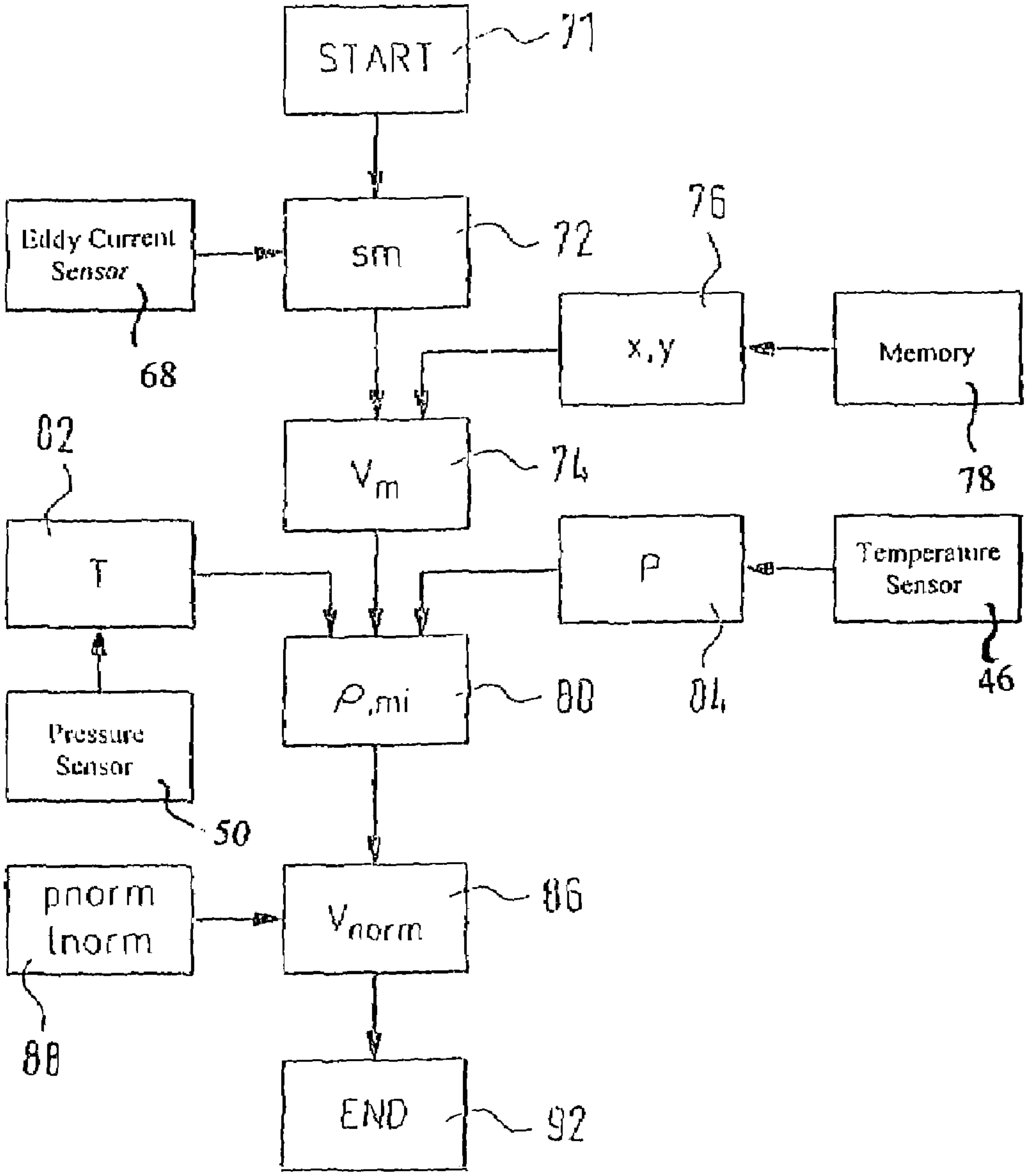
FIG. 2 shows a flowchart of a method for operating the device from FIG. 1.

The device shown in FIG. 1 and the method shown in FIG. 2 can considerably improve the precision in the calculation of a volume injected into the measuring chamber 45 under defined norm conditions (norm temperature and norm pressure) and in the calculation of the actually injected testing fluid mass. This increase in precision has an especially significant effect, particularly on the measurement of small injection quantities.

In an exemplary embodiment that is not shown, the pressure which prevails in the testing fluid in the measuring chamber and is detected by the pressure sensor is also used for malfunction and safety monitoring of the device. If the pressure of the testing fluid in the measuring chamber lies beyond a defined limit, then it can be assumed that there is a malfunction in the system so that an error message is generated. For example with a jam med piston, a very rapid increase in the pressure in the measuring chamber can occur, which can cause damage to the device. In this instance, when the pressure of the testing fluid in the measuring chamber exceeds a limit, the magnetic drain valve 53 is triggered by the control and processing unit so that the valve opens and testing fluid is drained from the measuring chamber and the pressure in the measuring chamber is reduced. This reliably prevents damage to the device for example due to a jamming of the piston.

The foregoing relates to preferred exemplary embodiments of the invention, it being understood that other variants and embodiments thereof are possible within the spirit and scope of the invention, the latter being defined by the appended claims.

What is claimed is:

1. A method for measuring the injection quantity of motor vehicle injection systems during production testing, in which an injection system (32, 33) injects a testing fluid into a measuring chamber (45) and the movement that an injection produces in a piston (40), which at least partially defines the measuring chamber (45), is detected by a detection device (68), which generates a measurement signal (sm), the method comprising detecting the pressure (p) of the testing fluid in the measuring chamber (45), and processing (80) the measurement signal (sm) taking into account the detected pressure (p).

2. The method according to claim 1 further comprising the steps of detecting the temperature (T) of the testing fluid in the measuring chamber (45) and processing (80) the measurement signal (sm) taking into account the temperature (T) of the testing fluid.

3. The method according to claim 2 wherein, taking into account the detected pressure (P) and the detected temperature (T), the density of the testing fluid in the measuring chamber (45) is determined, and based on the determined density, a comparison volume (Vnorm) is determined at a particular comparison pressure (pnorm) and a particular comparison temperature (tnorm).

4. The method according to claim 3 wherein the progression of the pressure during an injection is detected and the measurement signal is processed taking into account the detected progression of the pressure.

5. The method according to claim 3 further comprising generating an error message when the pressure (p) of the testing fluid in the measuring chamber (45) lies beyond a limit.

6. The method according to claim 3 further comprising activating a safety device (53) when the pressure (p) of the testing fluid in the measuring chamber (45) exceeds a limit to thereby reduce the pressure (p) of the testing fluid in the measuring chamber (45).

7. The method according to claim 2 wherein the progression of the pressure during an injection is detected and the measurement signal is processed taking into account the detected progression of the pressure.

8. The method according to claim 2 further comprising generating an error message when the pressure (p) of the testing fluid in the measuring chamber (45) lies beyond a limit.

9. The method according to claim 2 further comprising activating a safety device (53) when the pressure (p) of the testing fluid in the measuring chamber (45) exceeds a limit to thereby reduce the pressure (p) of the testing fluid in the measuring chamber (45).

10. The method according to claim 1 wherein, taking into account the detected pressure (p), the density of the testing fluid in the measuring chamber (45) is determined, and based on the determined density, a comparison volume (Vnorm) is determined at a particular comparison pressure (pnorm).

11. The method according to claim 10 wherein the progression of the pressure during an injection is detected and the measurement signal is processed taking into account the detected progression of the pressure.

12. The method according to claim 10 further comprising generating an error message when the pressure (p) of the testing fluid in the measuring chamber (45) lies beyond a limit.

13. The method according to claim 10 further comprising activating a safety device (53) when the pressure (p) of the testing fluid in the measuring chamber (45) exceeds a limit to thereby reduce the pressure (p) of the testing fluid in the measuring chamber (45).

14. The method according to claim 1 wherein the progression of the pressure during an injection is detected and the measurement signal is processed taking into account the detected progression of the pressure.

15. The method according to claim 1 further comprising generating an error message when the pressure (p) of the testing fluid in the measuring chamber (45) lies beyond a limit.

16. The method according to claim 15 further comprising activating a safety device (53) when the pressure (p) of the testing fluid in the measuring chamber (45) exceeds a limit to thereby reduce the pressure (p) of the testing fluid in the measuring chamber (45).

17. A computer program suitable for executing the method according to claim 1 when the program is run on a computer.

18. The computer program according to claim 17 wherein the program is stored in a memory.

19. A device for measuring the injection quantity of motor vehicle injection systems (32, 33) during production testing, comprising a measuring chamber (45) into which an injection system (32, 33) can inject a testing fluid, a piston (40), which at least partially defines a measuring chamber (45), a detection device (68), which detects a movement of the piston (40) and generates a corresponding measurement signal (sm), a further detecting device (50) for detecting the pressure of the testing fluid in the measuring chamber (45), and a processing unit (52) in which the measurement signal (sm) is processed (80) taking into account the detected pressure (p).

20. The device according to claim 19 wherein the processing unit comprises a computer program suitable for controlling the processing the measurement signal (sm) taking into account the detected pressure (p).

21. A method for measuring the injection quantity of injection systems during production testing, in which an injection system (32, 33) injects a testing fluid into a measuring chamber (45) and the movement that an injection produces in a piston (40), which at least partially defines the measuring chamber (45), is detected by a detection device (68), which generates a measurement signal (sm), the method comprising detecting the pressure (p) of the testing fluid in the measuring chamber (45), and processing (80) the measurement signal (sm) taking into account the detected pressure (p).

22. A device for measuring the injection quantity of injection systems (32, 33) during production testing, comprising a measuring chamber (45) into which an injection system (32, 33) can inject a testing fluid, a piston (40), which at least partially defines a measuring chamber (45), a detection device (68), which detects a movement of the piston (40) and generates a corresponding measurement signal (sm), a further detecting device (50) for detecting the pressure of the testing fluid in the measuring chamber (45), and a processing unit (52) in which the measurement signal (sm) is processed (80) taking into account the detected pressure (p).

* * * * *